April 27, 1926.
R. J. WENSLEY
1,582,715
AUTOMATIC HYDROELECTRIC STATION
Filed Dec. 20, 1923
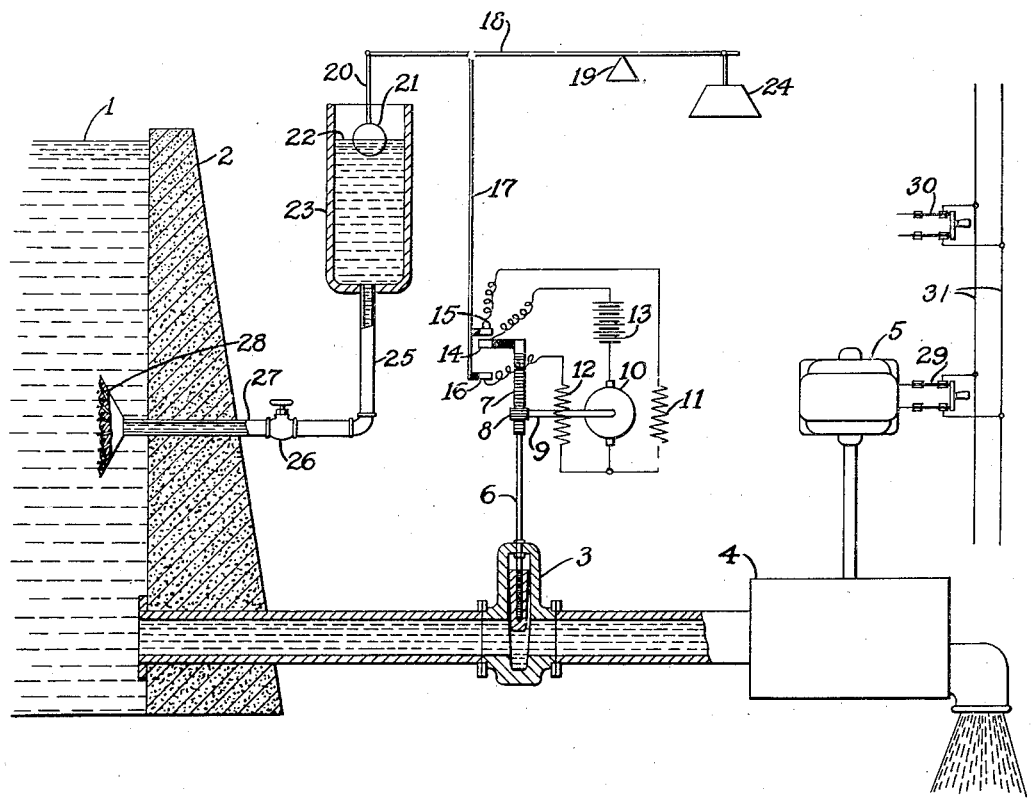
WITNESSES:
INVENTOR
Roy J. Wensley
BY
ATTORNEY Patented Apr. 27, 1926.

1,582,715

UNITED STATES PATENT OFFICE.

ROY J. WENSLEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

AUTOMATIC HYDROELECTRIC STATION.

Application filed Decemebr 20, 1923. Serial No. 681,741.

*To all whom it may concern:*

Be it known that I, ROY J. WENSLEY, a citizen of the United States, and a resident of Edgewood Park, in the county of Allegheny and State of Pennsylvania, have invented a new and useful Improvement in Automatic Hydroelectric Stations, of which the following is a specification.

My invention relates to automatic stations and particularly to automatic hydro-electric generating stations.

One object of my invention is to provide an automatic hydro-electric generating station that shall have means for automatically adjusting the rate of energy translation of the station in accordance with the amount of fluid energy available.

Another object of my invention is to provide a system, of the above-indicated character, that shall have means for precluding operation of the station when the amount of fluid energy available is less than a predetermined value.

A further object of my invention is to provide a system, of the above-indicated character, that shall have means for causing the station to operate at its full rated capacity when the amount of fluid energy available exceeds a predetermined value.

A still further object of my invention is to provide a system, of the above-indicated character, that shall be simple and inexpensive to construct and reliable in its operation.

My invention comprises, in general, a source of fluid energy, a prime mover operated thereby, an electrical translating device such as a generator driven by the prime mover and means for automatically regulating the rate of supply of fluid energy to the prime mover in accordance with the amount of fluid energy available.

The single figure of the accompanying drawings is a diagrammatic view of the circuits and apparatus embodying my invention.

Referring to the drawing, a body 1 of fluid, such as water that is restrained by a dam 2, and which constitutes a source of fluid energy, is connected through a gate valve 3 to a prime mover 4. A generator or other electrical translating device 5 is adapted to receive the energy supplied by the prime mover 4. The degree of opening of the gate valve 3 is controlled by a rod 6 upon which a rack 7 is mounted. The rack 7 is engaged by a pinion 8 that is mounted on the shaft 9 of a motor 10. The motor 10 is provided with two field-magnet windings 11 and 12 that are so disposed as to cause the motor 10 to rotate in either of two directions, depending upon which one of the field-magnet windings is energized.

A battery or other source of electrical energy 13 is adapted to supply energy to the motor 10 through contact members 14, 15 and 16. The contact member 14 is mounted on the rack 7 and the contact members 15 and 16 are mounted on a rod 17 that is pivotally mounted on a lever arm 18 having a fulcrum 19. A rod 20 is mounted at one end of the lever arm 18 on the same side of the fulcrum 19 as the rod 17. On the lower end of the rod 20 is mounted a float 21, the position of which is controlled by the level of water 22 in a chamber 23. A weight member 24 is so mounted on the lever arm 18 on the other side of the fulcrum 19 from the rods 17 and 20 as to substantially counterbalance the weight of the rods 17 and 20 and the float 21.

The chamber 23 is connected to the body 1 or water through a pipe or conduit 25, a valve 26, a pipe or conduit 27, and a screen 28. Thus, the level of water 22 in the chamber 23 is the same as that of the body 1 of water except when the level of the body of water is varying so rapidly that the inertia of the water in the chamber 23 and the friction of the pipes 25 and 27, the valve 26 and the screen 28 prevent the level 22 from varying with equal rapidity. The valve 26 is provided in order that sufficient friction may be introduced to the flow of water between the body 1 and the chamber 23 as to prevent rapid changes of the level 22 in the event that the level of the body 1 of water should change rapidly.

With the level of the body 1 in the position indicated in the diagram, the level of water 22 in the chamber 23 maintains the float 21 in such position as to preclude engagement of the contact 14 by either of the contact members 15 and 16. Thus, energization of the motor 10 from the battery 13 is precluded.

It may be assumed that the level of the body 1 falls to, and remains in, such a position for a sufficient interval of time, to permit the level 22 to assume substantially the same level whereby the float 21 falls far enough to cause the contact member 15 to engage the contact member 14. A circuit is then established from the battery 13 through the contact members 14 and 15, the field-magnet winding 11 and the armature of the motor 10, back to the battery 13.

The field-magnet winding 11 is so connected with respect to the armature of the motor 10 that it causes the motor to rotate the shaft 9 and pinion 8 in such direction as to lower the rod 6 to thereby lessen the degree of opening of the gate valve 3. The rate of supply of energy to the prime mover 4 from the body 1 of water is thereby lessened. When the rack 7 has moved downward to such an extent that the contact member 14 disengages the contact member 15, the circuit between the battery 13 and the motor 10 is interrupted and operation of the motor 10 is stopped. Operation of the prime mover 4 is then continued with a lower rate of supply of energy from the body 1.

If the level of the body 1 of water rises to such position that the float 21 so actuates the lever 18 and the rod 17 as to cause the contact member 16 to engage the contact member 14, a circuit is established from the battery 13 through the contact members 14 and 16, the field-magnet winding 13 and the armature of the motor 10 back to the battery 13. The field-magnet winding 12 is so connected with respect to the armature of the motor 10 as to cause the motor to rotate its shaft 9 and pinion 8 in such direction as to raise the rack 7 and rod 6 to increase the degree of opening of the gate valve 3. The motor 10 continues to operate until the contact member 14 disengages the contact member 16, when the circuit extending between the battery 13 and the motor 10 is interrupted and further change of the degree of opening of the valve 3 is precluded until the contact member 14 is again engaged by either of the contact members 15 and 16.

From the foregoing description, it is clear that the degree of opening of the gate valve 3 is controlled by the level of water in the body 1 in such manner that when this level is relatively high, the degree of opening of the valve 3 is increased to a relatively large value, and when this level is relatively low, the degree of opening of the valve 3 is decreased to a relatively low value. This system for controlling the degree of opening of the valve 3 and, consequently, the rate of supply of fluid energy from the body 1 of water to the prime mover 4, so regulates the rate of energy translation of the prime mover 4 as to tend to maintain the amount of fluid energy in the body 1 of water between predetermined limits.

Should the level of water in the body 1 fall to such position that the motor 10 causes the opening of the gate valve 3 to be decreased substantially to zero, operation of the prime mover 4 will be precluded until the amount of fluid energy available in the body 1 again rises to such value as to cause the contact member 16 to engage the contact member 14 to thereby cause the motor 10 to again open the valve 3.

On the other hand, should the level of water in the body 1 rise to such a value as to cause the motor 10 to increase the degree of opening of the valve 3 to its maximum value, the prime mover 4 will operate at its maximum rated capacity until the level of water again falls to such a value as to be within the range of control of the float 21 and contact members 14, 15 and 16.

An important feature of my invention is the anti-hunting characteristic of its operation. The damping action of the valve 26 prevents rapid changes of the level of water 22 in the chamber 23 in the event that the level of the body 1 changes rapidly as previously described. Furthermore, the clearance between the contact member 14 and the contact members 15 and 16, respectively, may be adjusted to cause the degree of opening of the gate valve 3 to be changed in response to a variation of the level of water in the body 1 over any desired range.

The system embodying my invention is further adapted to control the operation of an automatic station comprising a plurality of energy-translating units. If such a station is to be controlled, a system of control similar to that shown in the accompanying diagram and described above is provided for each unit. For example, a second unit would comprise a prime mover and an electrical translating device, not shown, similar to the prime mover 4 and the electrical device 5, respectively, as shown for the first unit. The electrical device of the second unit would be connected to a common distribution circuit 31 through suitable connecting means 30 in the same manner that the device 5 is connected to the circuit 31 through connecting means 29. In this manner, any desired number of units may be connected to the circuit 31.

The mechanism for controlling the position of the contact members 15 and 16 in the system for controlling the second unit is so adjusted that operation of the second unit is initiated when the level of the body 1 is higher than the level at which the first unit operates at its full rated capacity. Each succeeding unit is provided with a similar system that is adapted to initiate the operation of its corresponding energy-translating unit when the level of the body 1 is higher than the level at which the preceding unit operates at its full rated capacity. Thus, each unit, except the last one to be started, operates at its full rated capacity while the last unit to be started operates at a variable rate depending upon the rate of change of the level of the body 1.

It will be understood that the system embodying my invention is not limited to the specific details of construction and connections that have been described in the foregoing specification, as many changes and modifications may be made therein without departing from the spirit and scope of my invention, as set forth in the appended claims.

I claim as my invention:

1. The combination with a source of fluid energy, a fluid-operated prime mover adapted to receive energy from said source, a valve for controlling the rate of supply of energy from the source to the prime mover, and a stem for the valve, of a plurality of movable electrical contact members, means for positioning said contact members in accordance with the amount of fluid energy available at the source, another movable electrical contact member actuated by the valve stem and adapted to engage the first-mentioned contact members selectively, and means governed by the selective engagement of the several contact members for controlling the degree of opening of the valve.

2. The combination with a source of fluid energy, a fluid-operated prime mover adapted to receive energy from said source, a valve for controlling the rate of supply of energy from the source to the prime mover, and a stem for the valve, of a plurality of movable electrical contact members, means for positioning said contact members in accordance with the amount of fluid energy available at the source, another movable electrical contact member actuated by the valve stem and adapted to engage the first-mentioned contact members selectively, and means governed by the selective engagement of the several contact members for controlling the degree of opening of the valve to cause energy to be supplied to the prime mover from the source at a rate that is substantially in direct proportion to the amount of energy available at the source.

3. The combination with a source of fluid energy, a fluid-operated prime mover adapted to receive energy from said source, and a valve for controlling the rate of supply of energy from the source to the prime mover, of a plurality of movable electrical contact members, means for actuating certain of said contact members in accordance with the amount of energy available at the source, means for actuating certain other of said contact members in accordance with the degree of opening of the valve, said first-mentioned contact members and said last-mentioned contact members being adapted to co-operate, and means governed by the co-operation of said contact members for controlling the degree of opening of the valve.

4. The combination with a source of fluid energy, a fluid-operated prime mover adapted to receive energy from said source, and a valve for controlling the rate of supply of energy from the source to the prime mover, of a plurality of movable electrical contact members, means for actuating certain of said contact members in accordance with the amount of energy available at the source, means for actuating certain other of said contact members in accordance with the degree of opening of the valve, said first-mentioned contact members and said last-mentioned contact members being adapted to co-operate, and means governed by the co-operation of said contact members for controlling the degree of opening of the valve to cause energy to be supplied to the prime mover from the source at a rate that is substantially in direct proportion to the amount of energy available at the source.

5. The combination with a main fluid-storage reservoir and a fluid-operated prime mover, of a pipe or conduit for conducting fluid from the main reservoir to the prime mover to operate the same, a valve in said pipe or conduit, a stem for the valve, a reversible electric motor for actuating the valve by means of the stem, an electrical contact member secured to the valve-stem, an auxiliary fluid reservoir, a pipe or conduit for connecting the auxiliary reservoir with the main reservoir, a manually-operated valve in said pipe or conduit, the degree of opening of which may be varied to cause the fluid level in the auxiliary reservoir to be substantially the same as that in the main reservoir, but to prevent rapid oscillations in the level in the main reservoir from being communicated to the auxiliary reservoir, a float actuated by the fluid in the auxiliary reservoir, and a pair of electrical contact members actuated by the float and selectively adapted to engage the contact member secured to the valve-stem to control the energization of the reversible electric motor in such manner that it maintains the degree of opening of the valve between the main reservoir and the prime mover in substantially direct proportion to the amount of fluid in the main reservoir.

In testimony whereof, I have hereunto subscribed my name this 4th day of December, 1923.

ROY J. WENSLEY.